United States Patent [19]

Nelson et al.

[11] 4,007,058
[45] Feb. 8, 1977

[54] MATRIX CONSTRUCTION FOR FUEL CELLS

[75] Inventors: Alfred Dwayne Nelson, Stillwater; Larry E. Espelien, St. Paul, both of Minn.

[73] Assignee: Minnesota Mining and Manufacturing Company, St. Paul, Minn.

[22] Filed: Dec. 11, 1974

[21] Appl. No.: 531,718

Related U.S. Application Data

[63] Continuation-in-part of Ser. No. 347,545, April 4, 1973, abandoned.

[52] U.S. Cl. .................................. 429/34
[51] Int. Cl.² .................. H01M 8/00; H01M 2/00
[58] Field of Search ............ 136/86 R, 146, 153

[56] References Cited

UNITED STATES PATENTS

| | | | |
|---|---|---|---|
| 3,159,507 | 12/1964 | Abbe et al. | 136/146 |
| 3,216,864 | 11/1965 | Bushrod et al. | 136/146 |
| 3,328,230 | 6/1967 | Levecque et al. | 136/146 |
| 3,651,030 | 3/1972 | Desaulnier et al. | 136/153 X |

*Primary Examiner*—John H. Mack
*Assistant Examiner*—H. A. Feeley
*Attorney, Agent, or Firm*—Alexander, Sell, Steldt & DeLaHunt

[57] ABSTRACT

This invention pertains to a fuel cell which comprises a case, positive and negative electrodes inserted therein and electrolyte filling the inner space between the electrodes. Means for introducing an oxidizing gas into the space behind one electrode and a fuel behind the other are provided. A porous membrane substantially parallel to the electrodes comprising a self-supporting compressible porous fibrous mat of randomly dispersed and entangled micro-fibers of a high molecular weight thermoplastic polymer impregnated with said electrolyte occupies said inner space. This porous membrane permits communication of electrolyte between electrodes but prevents passage of small bubbles of oxidizing or fuel gases.

4 Claims, 1 Drawing Figure

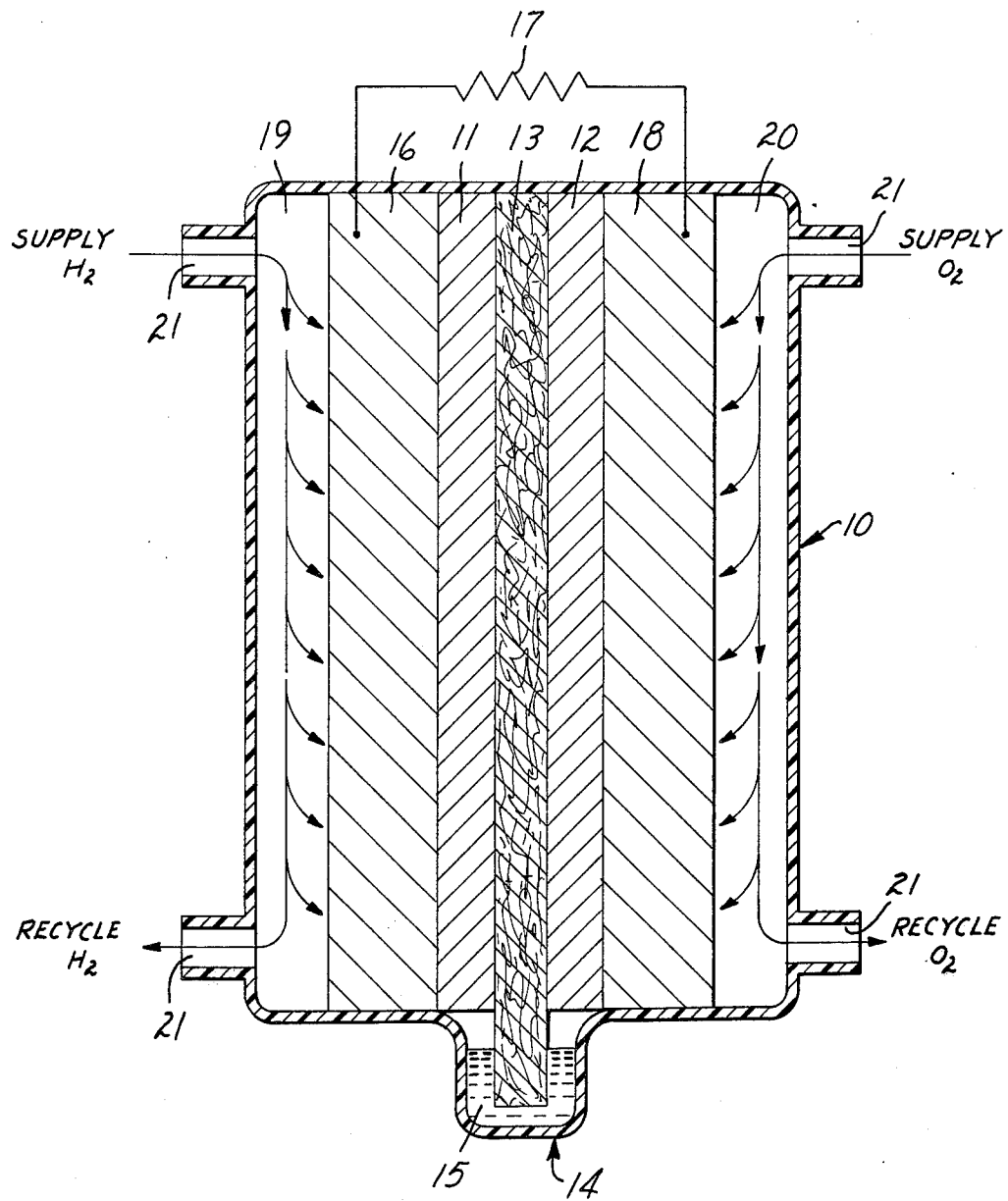

MATRIX CONSTRUCTION FOR FUEL CELLS

This application is a continuation-in-part of application Ser. No. 347,545, filed Apr. 4, 1973, now abandoned.

Fuel cells are devices for generating electricity from common fuels such as natural gas, kerosene or gasoline by conversion of the latent chemical energy of the fuel directly into direct current electricity in an electrochemical process wherein gaseous hydrogen is combined electrochemically with oxygen. A single fuel cell comprises a fuel electrode (anode), an oxidant electrode (cathode) and an ionic conductor i.e., the electrolyte, between the two electrodes.

Fuel cells are to be distinguished from batteries which when in a charged condition release a flow of electrons (current) through an external circuit as a result of reactions occurring between the active electrode materials and ions transported by the electrolyte. Batteries in turn can be grouped as (1) "secondary" cells, i.e., those in which the reactions are reversible and the active materials can be returned to their original state by "charging" which is the process of applying electrical current from an external source in the opposite direction to the flow of the cell's discharge current, and (2) "primary" cells in which the active materials at discharge cannot be returned to their original state.

In a typical fuel cell operation, fuel in the form of gaseous hydrogen is supplied to the anode and the oxidant, air or oxygen, is supplied to the cathode. The electrolyte separates the fuel and oxygen thus preventing direct reaction therebetween. The overall fuel oxidation reaction may be considered as the sum of the reactions which occur at the anode and cathode:

| Anode Reaction | Cathode Reaction |
|---|---|
| $H_2 \longrightarrow 2H_{ads}$ | $\frac{1}{2} O_2 \longrightarrow O_{ads}$ |
| $2H_{ads} \longrightarrow 2H^+ + 2e^-$ | $O_{ads} + 2H^+ + 2e^- \longrightarrow H_2O$ |

The combination of anode reaction with cathode reaction results in the overall electrochemical reaction:

$$H_2 + \tfrac{1}{2} O_2 \rightarrow H_2O$$

The electrochemical reaction may be considered as having two separate and distinct electrical pathways: electrons from the anode going to the external electrical load, thence to the cathode and protons by migration through the separator matrix to combine at the cathode with oxygen and electrons to form $H_2O$ which is swept away with the recirculating air on the cathode side of the cell. The generation process is continuous as long as fuel and air are supplied and an external electrical load is applied.

The electrodes must, of course, be good conductors and have large surface areas as well as being porous since they provide the interface in which the electrochemical reaction occurs. Also, they must be good catalysts of these reactions or serve as a support for a catalyst carried thereon. The electrodes must be resistant to chemical reaction with the electrolyte. The least reactive of metals are the precious metals, particularly the platinum group which is neither attacked by weak acids nor by alkalies. They are good catalysts even at low temperatures on the order of 100° C. and are especially good catalysts at higher temperatures. Despite their extremely high cost, the platinum catalysts can be used in cells operating at relatively high temperatures on the order of 250° C. and higher, since their increased efficiency will more than offset the initial high cost even when compared to less expensive and less active catalysts such as nickel.

The electrolyte used in fuel cells must have a high conductivity and usually contains oxygen bearing ions. Examples are sulfuric acid, containing the ion $-SO_4^{--}$, alkaline metal hydroxides, containing $-OH^-$ ions, carbonates which contain the ion $-CO_3^{--}$ and phosphorous based acids which contain the $-PO_4^{---}$ ion. The electrolyte must not attack the electrode material or react with the fuel or the products of its oxidation; furthermore, it must not react with the vessel or container.

Fuel cells are low voltage, high current systems. A single fuel cell generates roughly 1 volt of DC and will create roughly 100–200 watts of electricity for each square foot of electrode cross-sectional area. By assembling a number of cells together and connecting them in series, it is possible to create voltages from 100 to 1000 volts and power levels from 1 kilowatt to 10 or more megawatts. Therefore, it is desirable to construct individual cells so that they are as narrow as possible. In other words, it is desirable to have the electrodes relatively close together with the minimum of electrolyte therebetween. Theoretically, the oxidizing and reducing gases introduced through the porous electrodes react on the surface of the electrodes.

It is preferential to minimize the resistance of ionic movement within the cell, chiefly in the separator matrix. At the same time, it is desirable to run the cell at as high an operating pressure as possible. If, however, the operating pressure is too high, then there may be a tendency on the part of the fuel or oxidizing gas to displace the acid which is imbibed in the separator matrix (which should function as a gas separator as well as an electrode separator) resulting in the mixture of the two gases. When this occurs, conditions for a strong exothermic reaction exist which may cause catastrophic cell failure due to a localized hot spot burning a portion of the cell out.

It is an object of this invention to provide a fuel cell construction in which the electrodes can be placed relatively close together and wherein the danger of bubbles of oxidizing and fuel gases meeting is minimized.

It is a further object of the invention to provide a fuel cell construction in which the inner space containing the electrolyte is separated by a porous matrix which is relatively inert to the aqueous electrolyte at operating temperatures and which is easily wet by the electrolyte thereby providing an effective barrier to bubbles.

The invention will be more readily understood from the following detailed description and disclosure, especially in light of the accompanying schematic diagramatic drawing of a fuel cell in section.

Referring to the diagram, the fuel cell comprises a case or container 10, two spaced apart porous electrodes 11 and 12 having opposed surfaces; two porous conductive current collector plates 16 and 18, each of which engages one of the opposed electrode surfaces; and a porous, gas-impermeable, ion-permeable, conductive separator matrix member 13 disposed between and in contact with the electrodes 11 and 12. In the particular embodiment illustrated, the two electrodes 11 and 12, the two conductive current collector plates 16 and 18, and the separator matrix member 13 are all in the form of flat plates, although any other suitable geometry could be employed. The plastic container 10 in conjunction with current collector plates 16 and 18 forms gas chambers 19 and 20. The container 10 is provided with openings 21 to permit the passage of gases through the chambers 19 and 20.

Electrolyte cavity 14 adjacent the end of the separator matrix member 13 is provided to contain electrolyte 15 which is wicked up into the matrix member 13. The matrix member 13 should be sufficiently long to protrude down into the cavity 14 so that it is always in contact with the liquid electrolyte 15 therein.

The separator matrix member 13 is soaked with a liquid electrolyte, thereby providing an ionically conductive path between the two electrodes. The two electrodes are connected through current collector plates 16 and 18 to an external electrical load circuit 17. The electrode 11 is supplied with a gaseous fuel, such as hydrogen, and the electrode 12 is supplied with a gaseous oxidant, such as oxygen. With hydrogen and oxygen as the fuel and oxidant, respectively, the electrolyte is suitably composed of an aqueous solution of 85% phosphoric acid. Other fuels and oxidant combinations such as hydrogen and chlorine may be used.

The electrodes 11 and 12 may be made of any suitable material which is sufficiently inert in the cell environment, which is reasonably electrically conductive, and which provides a support on which the electrochemical reactions can occur. It has been found that graphite fits these requirements very well, although nickel and other materials will also suffice. Moreover, the electrodes may, and usually have, catalysts such as the platinum metals, iron, nickel and spinels, deposited thereon for promoting the electrochemical reactions. The electrodes 11 and 12 must also be gas permeable in order to permit the gas to reach the area where the electrode and electrolyte meet, but the electrodes must not be so porous that the electrolyte readily passes therethrough. Of course, the exact porosity and pore size required in any given cell depends somewhat on the particular fuel and oxidant employed, the type of electrodes and electrolyte employed, and the particular operating conditions, such as temperatures and pressures. The porous electrodes may be made by sintering particulate materials together, or by any other processes known in the art, e.g., graphitizing resin, impregnated graphite papers, molding or extruding carbon.

In the fuel cell illustrated herein, the porous conductive current collector plates 16 and 18 are made of the same material as electrodes 11 and 12 and differ therefrom only in thickness, usually being about two to five times as thick as the electrodes. The current collector plates 16 and 18 function to uniformly conduct current away from the adjacent surface of the respective electrodes 11 and 12 such as to prevent exceedingly high current densities which could damage the electrodes. The current collector plates 16 and 18 also function as a manifold to provide for a uniform supply of fuel or oxidant to the adjacent electrode.

The separator matrix member 13 must have an interconnecting pore or capillary structure which is ion-permeable and gas-impermeable. The interconnecting capillary cell structure is essential for good wicking action to distribute the liquid electrolyte throughout the member 13. Permeability may be expressed in terms of bubble pressure, i.e., the pressure in psi required to displace electrolyte from the matrix. The test involves impregnating a 2½ inch circular piece of matrix material with electrolyte and measuring the amount of nitrogen gas pressure required to displace a small amount of the electrolyte from the matrix. The member 13 should be as thin as possible consistent with good mechanical strength in order to minimize the internal resistance of the cell. In cells according to this invention, the inner space is extremely narrowed and the amount of electrolyte reduced because the porous matrix prevents communication of bubbles of reducing gas or oxidizing gas across the matrix.

The porous fibrous separator matrix 13 of the present invention comprises a self-supporting compressible porous fibrous mat of randomly dispersed and entangled microfibers of a high molecular weight thermoplastic polymer, such a polyarylsulfone, polysulfone and polyethersulfone and polyphenylene sulfide polymers.

Porous fibrous separator matrix 13 was prepared by slowly dissolving two pounds of a polyarylsulfone ether, prepared essentially in accordance with Example 6 of British Specification No. 1,122,192, except that 33.5 kg. of biphenyl monosulfonyl chloride was used, in dimethylformamide to produce, after 6 hours stirring at 24° C., a 28% solids solution with a viscosity of 5000 centipoises (Brookfield Viscometer, No. 3 spindle at 30 rpm). Other useful polyarylsulfone ethers are disclosed in British Specifications Nos. 1,060,546; 1,163,975 and 1,016,245. The thus obtained solution was then spun according to the method shown and described in Ladisch, U.S. Pat. No. 2,571,457. The nozzle temperature was 24° C. and the air pressure was 70 psi. Very fine continuous or substantially continuous filaments or micro-fibers ranging in diameter between 0.05 micron to 1.5 microns were produced. The filaments were collected on a stationary aluminum screen to form mats having a thickness of 15 to 25 mils.

The micro-fibers forming the porous fibrous separator matrix 13 of the present invention are of extremely small diameter ranging from 0.01 micron to 5 microns with fibers having diameters ranging from 0.25 micron to 3 microns being preferred. Matrices have been produced with substantially uniform fiber distributions. One matrix was produced having fiber diameters ranging from 0.05 to 1.5 microns with 50% of the fibers having diameters between 0.25 and 0.50 microns and 75% of the fibers having diameters between 0.25 and 0.75 microns. Another matrix was produced having fiber diameters ranging from 0.14 to 1.75 microns with 40% of the fibers having diameters between 0.50 and 0.75 microns and 67% of the fibers having diameters between 0.25 and 1.0 microns.

Other matrices having correspondingly substantially uniformly distributed fibers with diameters ranging between 0.27 and 1.31 microns, 0.31 and 1.03 microns and 0.43 and 0.99 microns, and calipers of 35, 30 and 38 mils, respectively, were produced.

A porous fibrous separator matrix 13 formed of microfibers of polyarylsulfone ether polymer having diameters ranging from about 0.5 to 3 microns, having a thickness of about 20 mils and a basis weight of about 12.5 lbs. per 1000 square feet, a bubble pressure of 1.5 psi was found to be extremely stable in the presence of an electrolyte media consisting of 85% phosphoric acid at 350° F., and picked up about 13 times its weight of such electrolyte. Other matrix samples were found to pick up from seven to 22 times their weight of electrolyte media. At 500 hours exposure to 85% phosphoric acid at 350° F., no change was noted in the fibrous matrix and at 1300 hours, a 10% weight loss was noted.

In contrast, known fibrous matrices consisting of E-glass fiber membranes and of phenolic fiber membranes had weight losses ranging from 100% for the glass fiber membrane after 15 hours exposure to 85% phosphoric acid at 140° C., and 2.5% for the phenolic fiber membrane after 168 hours exposure to 85% phosphoric acid at 100° and 150° C., respectively, as reported in Ogden, U.S. Pat. No. 3,563,802.

The liquid electrolyte 15 is held in the separator matrix member 13 by capillary forces, and is returned to or resupplied from the reservoir 14. Since capillary forces are much stronger than gravitational forces, the liquid electrolyte soaks into and spreads rapidly throughout the interconnecting pore structure of the matrix member 13. This capillary action assures a fresh supply of electrolyte to the active electrode surfaces at all times without a means of forced circulation, provided, of course, that water removal by evaporation is maintained continuously.

The electrodes 11 and 12, the separator matrix member 13, and the current collector plates 16 and 18 are assembled by simply pressing them together under a pressure of about three hundred pounds per square inch and then holding them in that position by means of a suitable casing or container 10. Sufficient electrolyte is available at the active electrode surfaces through the wetted separator matrix 13 to maintain the cell reaction, and yet there is little chance of the liquid electrolyte being drawn into the pores of the electrodes 11 and 12.

Since the separator matrix member 13 between the electrodes 11 and 12 is gas-impermeable, it prevents gas cross-leakage without the need for precise control of gas pressure or electrode pore size, provided only that the pressure differential on the two sides of the separator matrix member is lower than the bubble pressure. Fuel and oxidant gases can be supplied under pressure, even to the extent of permitting gas bubbles to form on the electrolyte sides of the electrodes. Such bubble formation, which might be caused by slightly imperfect electrodes, is harmless. Even if there is a sudden change in gas pressure at either electrode, there is no gas shorting across the electrolyte-filled separator matrix member. Also, since the gases cannot travel through the separator matrix member, they cannot chemically recombine, and excess gas can be recycled in order to raise the overall efficiency of the fuel cell.

The porous conductive separator matrix member is both physically and chemically stable. Since the member is ion permeable, it also provides for a high mobility of protons in the cell.

The outstanding ability of the separator matrix member of this invention to retain liquid electrolyte therein provides a solution to one of the most troublesome problems encountered with the use of very thin electrodes on the order of 10 mils. Even when such extremely thin electrodes are highly liquid repellent, they tend to permit leaking of liquid electrolyte through the electrode into the gas manifold space over long periods of operation. This difficulty is eliminated when the separator matrix member 13 is employed between the thin electrodes, thereby eliminating any hydrostatic pressure on the electrodes. Considerably longer life can be obtained from such cells than has been possible heretofore.

It is generally known that the efficiency of fuel cells will increase as the operating temperature is increased, so long as temperature range is within the limits determined by stability of materials of which the cell is made. The porous fibrous separator matrix of the present invention will enable fuel cells to be operated at temperatures in the range of 275° to 475° F. or higher, in contrast to the 225° F. temperatures of conventional fuel cells. At the higher operating temperatures possible with applicants' fibrous matrices, less catalyst is required for continuous electrochemical reaction as the catalyst is more efficient at such temperatures and is less susceptible to the poisoning effects of impurities such as carbon monoxide which is more readily driven off the electrode surface resulting in a more active catalyst surface than in the prior art cells operating at lower temperatures.

We claim:
1. In fuel cell comprising a case, positive and negative porous electrodes inserted within the case and enclosing an inner space, electrolyte within said inner space, means for introducing an oxidant gas through one porous electrode and a fuel through the other, the improvement comprising having the inner space occupied by a thin porous fibrous separator matrix consisting essentially of a self-supporting compressible porous fibrous mat of uniformly distributed but randomly dispersed and entangled microfibers of a high molecular weight thermoplastic polyarylsulfone ether polymer.

2. The fuel cell of claim 1 wherein the microfibers comprising said separator matrix are substantially continuous and have diameters between about 0.01 micron and 3 microns.

3. The fuel cell of claim 1 wherein the microfibers comprising said separator matrix are substantially continuous and have diameters between about 0.05 micron and 1.5 microns.

4. The fuel cell of claim 1 wherein the separator matrix has a bubble pressure of about 1.5 psi.

* * * * *